United States Patent
Fortunato et al.

(10) Patent No.: US 9,528,542 B2
(45) Date of Patent: Dec. 27, 2016

(54) RIVETLESS NUT PLATE, RIVETLESS NUT PLATE ASSEMBLIES, WORKPIECES CONTAINING RIVETLESS NUT PLATE FASTENERS, AND RELATED METHODS

(71) Applicant: Greene, Tweed of Delaware, Inc., Wilmington, DE (US)

(72) Inventors: Kevin Fortunato, Ambler, PA (US); Steven Spadaccino, Levittown, PA (US); Fernando Torres, Paoli, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 156 days.

(21) Appl. No.: 13/966,999

(22) Filed: Aug. 14, 2013

(65) Prior Publication Data
US 2014/0064873 A1    Mar. 6, 2014

Related U.S. Application Data

(60) Provisional application No. 61/682,996, filed on Aug. 14, 2012.

(51) Int. Cl.
*F16B 37/04*    (2006.01)

(52) U.S. Cl.
CPC ........... *F16B 37/044* (2013.01); *F16B 37/048* (2013.01); *Y10T 29/49948* (2015.01)

(58) Field of Classification Search
CPC ........ F16B 37/04; F16B 37/043; F16B 37/044
USPC ................................ 411/103, 104, 107, 108
See application file for complete search history.

(56) References Cited

U.S. PATENT DOCUMENTS

| | | | | |
|---|---|---|---|---|
| 3,259,165 | A | * | 7/1966 | Tobian et al. ................. 411/85 |
| 3,765,078 | A | * | 10/1973 | Gulistan ...................... 29/432 |
| 4,059,199 | A | | 11/1977 | Quaney |
| 4,695,212 | A | * | 9/1987 | Berecz ......................... 411/85 |
| 4,732,518 | A | | 3/1988 | Toosky |
| 5,096,349 | A | | 3/1992 | Landy et al. |
| 5,209,620 | A | * | 5/1993 | Zare-Ardestani ............ 411/104 |

(Continued)

FOREIGN PATENT DOCUMENTS

CN    201434000 Y    3/2010

OTHER PUBLICATIONS

International Search Report and Written Opinion dated Jan. 17, 2014 from corresponding International Application, No. PCT/US2013/054946.

(Continued)

*Primary Examiner* — Roberta Delisle
(74) *Attorney, Agent, or Firm* — Flaster/Greenberg P.C.

(57) ABSTRACT

The invention encompasses a rivetless nut plate that includes: a base plate having an inferior face and a superior face, a plurality of extensions for engaging a fastener, each of the extensions extending from the superior face in a direction substantially perpendicular to the superior face, the extensions defining a cage region between the extensions, and the extensions being adapted to receive a retainer for retaining the fastener against the superior face in the cage region, and an anchor comprising a body extending from the inferior face to a distal end, having a groove to contain a portion of a substrate that is formed about the anchor being disposed between the inferior face and the distal end and the body having a conformation that is not rotationally symmetrical about an axis perpendicular to the inferior face of the base plate.

31 Claims, 13 Drawing Sheets

(56) References Cited

U.S. PATENT DOCUMENTS

| | | | |
|---|---|---|---|
| 5,245,743 A | | 9/1993 | Landy et al. |
| 5,378,099 A | | 1/1995 | Gauron |
| 5,380,136 A | | 1/1995 | Copple et al. |
| 5,405,228 A | | 4/1995 | Reid et al. |
| 5,468,104 A | * | 11/1995 | Reid et al. ............... 411/113 |
| 5,632,582 A | * | 5/1997 | Gauron .................. 411/82.1 |
| 6,077,010 A | * | 6/2000 | Reid et al. ............... 411/107 |
| 6,096,256 A | | 8/2000 | Aretz |
| 7,059,816 B2 | | 6/2006 | Toosky |
| 7,101,135 B2 | * | 9/2006 | Hassed .................. 411/432 |
| 7,114,900 B2 | * | 10/2006 | Toosky .................. 411/108 |
| 7,575,404 B2 | | 8/2009 | Toosky et al. |
| 7,591,622 B2 | * | 9/2009 | de Jesus et al. ......... 411/111 |
| 7,802,952 B2 | | 9/2010 | Toosky et al. |
| 7,823,262 B2 | * | 11/2010 | Toosky et al. ......... 29/402.03 |
| 7,921,539 B2 | * | 4/2011 | Woodall et al. ........ 29/525.01 |
| 7,997,530 B2 | | 8/2011 | Frisch et al. |
| 8,011,978 B2 | | 9/2011 | Cortes Rico et al. |
| 2007/0224016 A1 | | 9/2007 | Toosky et al. |
| 2008/0310931 A1 | | 12/2008 | Csik et al. |
| 2009/0103997 A1 | | 4/2009 | Csik et al. |
| 2010/0304063 A1 | | 12/2010 | McCrea et al. |
| 2011/0150599 A1 | | 6/2011 | Bakken et al. |

OTHER PUBLICATIONS

European Search Report dated Feb. 25, 2016 from corresponding European Application No. 13829774.2 (7 pages).
Response to European Search Report filed Sep. 20, 2016 from corresponding European Application No. 13829774.2, 17 pages Oct. 25, 2016.
Canadian Office Action dated Oct. 4, 2016 from counterpart Canadian Application 2,881,678.

* cited by examiner

RIVETLESS NUT PLATE, RIVETLESS NUT PLATE ASSEMBLIES, WORKPIECES CONTAINING RIVETLESS NUT PLATE FASTENERS, AND RELATED METHODS

CROSS REFERENCE TO RELATED APPLICATION

This application claims the benefit under 35 U.S.C. §119 (e) to U.S. Provisional Patent Application No. 61/682,996, filed Aug. 14, 2012, entitled "Rivetless Nut Plate, Rivetless Nut Plate Assemblies, Workpieces Containing Rivetless Nut Plate Fasteners, and Related Methods," the entire disclosure of which is incorporated herein by reference.

BACKGROUND OF THE INVENTION

Fasteners are used in a variety of industries, including the aerospace industry and the automotive industry for attaching two or more workpieces to one another. These fasteners often include a nut plate and a nut which are part of an assembly. Prior art nut plates include riveted nut plates, glued-in-place nut plates and swedged nut plates. In riveted nut plates, two or more rivets are passed though pre-worked holes in the workpiece to secure the body of the nut plate to the workpiece. The rivets are often used in conjunction with a sealant or adhesive, which is placed between the workpiece surface and the nut plate. Riveted nut plate technology has numerous drawbacks. For example, additional time and effort is required to work each of the holes into which the rivets are placed and increased costs are incurred through use of additional materials (the rivets) and their machining.

Some "rivet-free" prior art nut plate technologies use adhesive instead of rivets to secure the nut plate to the workpiece. Drawbacks of this technology include the additional costs of adhesive, and the increased installation time needed to apply and cure the adhesive. Moreover, because achieving the proper strength of the bond between the nut plate and the workpiece is important, specialized skill and attention to the cure of the adhesive is required.

Swedged or expanded "rivetless" nut plate technology was developed to permit installation of the nut plates without rivets. In these designs, a sleeve or mandrel is installed and expanded or swedged into the workpiece, and is engaged with a base portion of the nut plate to hold it in place on the workpiece. Technologies in this design are disclosed in, for example, U.S. Pat. Nos. 4,732,518; 5,096,349; 5,245,743; 5,405,228; 7,059,816 and 7,114,900. Drawbacks to these technologies include the time and special tools required for installation, as well as the potential for damage to the workpiece substrate, particularly when the substrate is a composite material. For example, radial over-expansion of a work hole in a composite substrate may lead to delamination of the composite; conversely, insufficient radial expansion impedes proper shear load transfer.

There remains a need in the art for a nut plate technology that does not require the introduction of holes in the workpiece structure, and which allows for rapid, verifiably secure and less expensive installation of the nut plate.

BRIEF DESCRIPTION OF THE SEVERAL VIEWS OF THE DRAWINGS

The following detailed description of various embodiments of the invention may be better understood when read in conjunction with the appended drawings. However, it should be understood that the invention is not limited to the precise arrangements and instrumentalities shown. In the drawings.

BRIEF SUMMARY OF THE INVENTION

Figure 1:
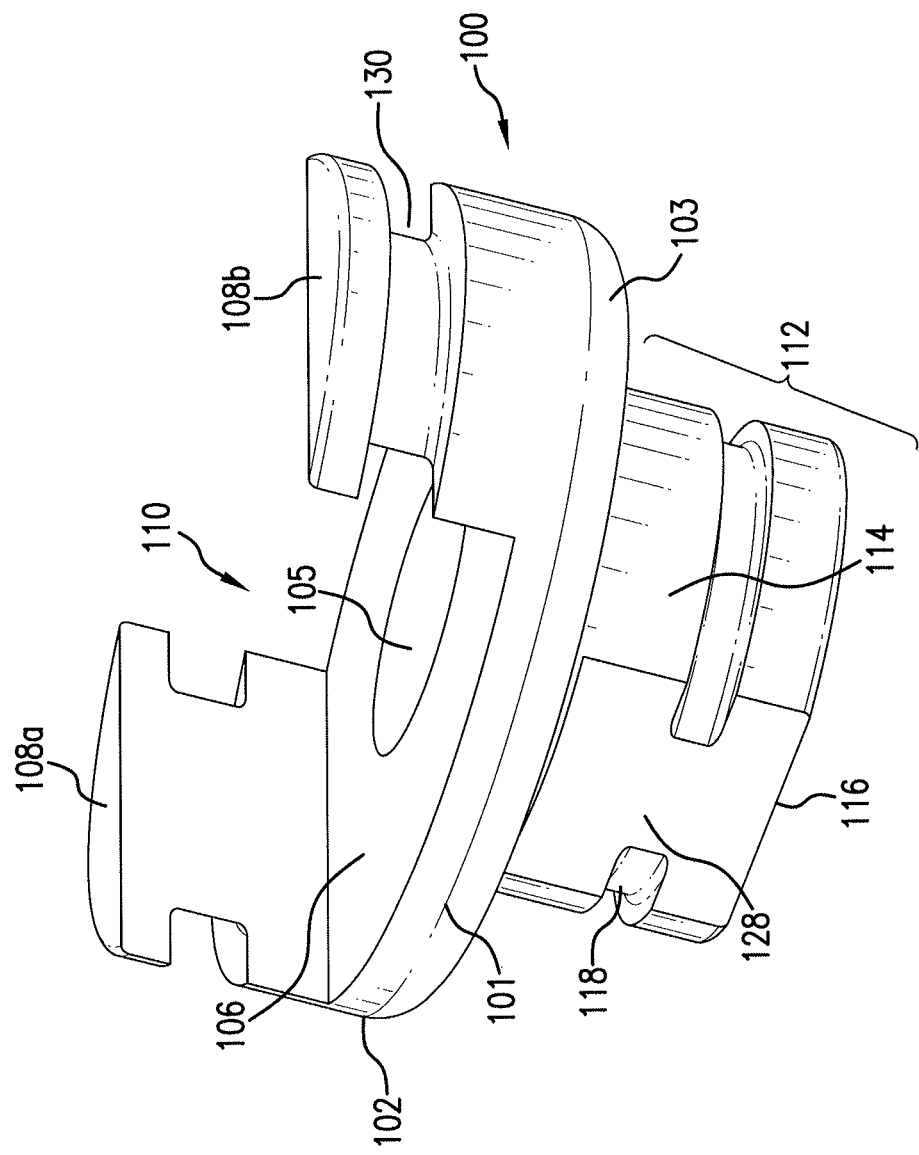
FIG. 1 is a side perspective view of an embodiment of the nut plate of the invention.
Figure 2:
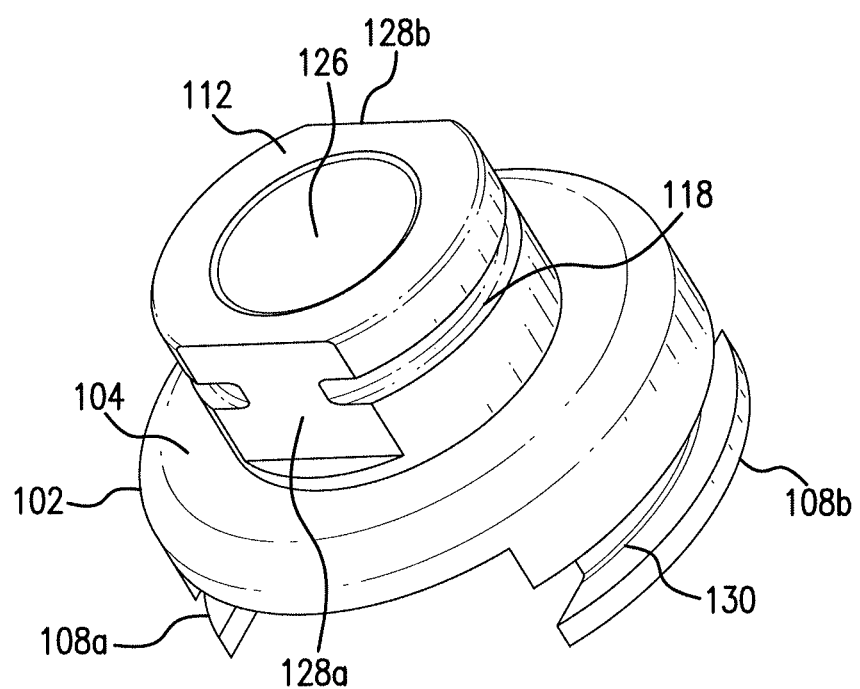
FIG. 2 is a bottom oriented perspective view of an embodiment of the nut plate of the invention.
Figure 3:
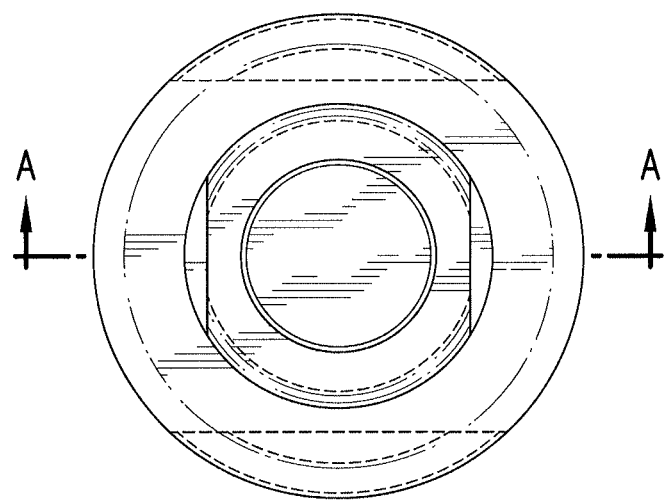
FIG. 3 is top plan view of an embodiment of the nut plate of the invention, showing the location of the plane A-A.
Figure 4:
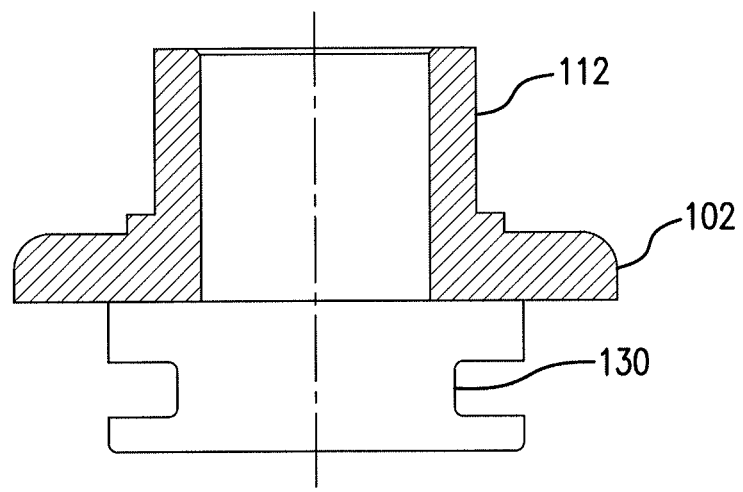
FIG. 4 is a cross section of an embodiment of the nut plate of the invention, taken at plane A-A.
Figure 5:
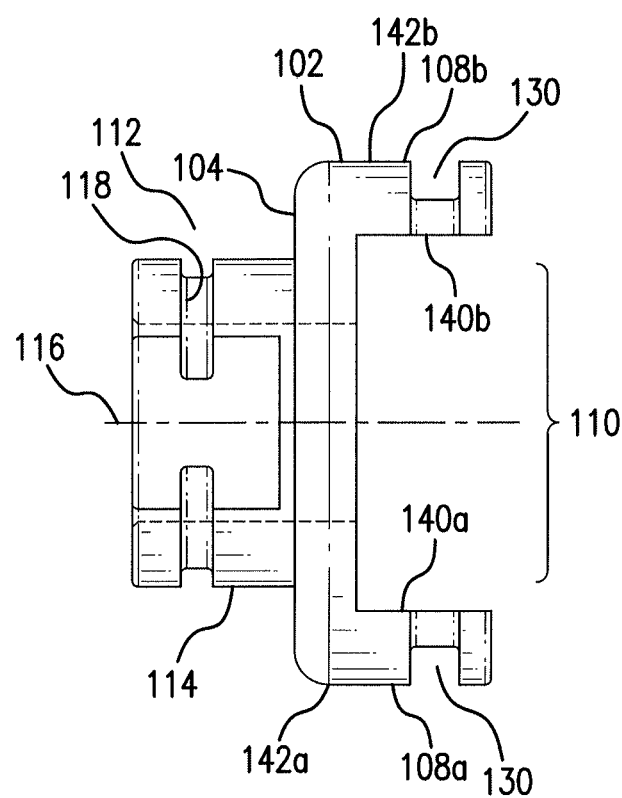
FIG. 5 is a side view of an embodiment of the nut plate of the invention.

The invention encompasses a rivet less nut plate that includes: a base plate having a substantially planar inferior face and a substantially planar superior face, a plurality of extensions for engaging a fastener, each of the extensions extending from the superior face in a direction substantially perpendicular to the superior face, the extensions defining a cage region between the extensions, and the extensions being adapted to receive a retainer for retaining the fastener against the superior face in the cage region, and an anchor comprising a body extending from the inferior face to a distal end, the body having a groove to contain a portion of a substrate that is formed about the anchor, the groove being disposed between the inferior face and the distal end and having an orientation that is not parallel to an axis of symmetry of the anchor and the body having a conformation that is not rotationally symmetrical about an axis perpendicular to the inferior face of the base plate. When the anchor of the nut plate is embedded in a substrate, the inferior face of the base plate is flush against the surface of the substrate, the nut plate cannot be withdrawn from the substrate without breaking or deforming the portion of the substrate accommodated within the groove, the nut plate cannot be rotated about the anchor, and the nut plate presents the cage region in a fixed disposition relative to the surface of the substrate.

Also included are workpieces containing this nut plate, nut plate assemblies and methods of manufacturing the same.

Also included are workpieces including a substrate and the nut plate of the invention and nut plate assemblies that include the nut plate of the invention, a retainer, and a fastener, such that the retainer engages the extensions and retains the fastener within the cage region and against the superior face of the base plate.

Methods of manufacturing a workpiece having the nut plate of the invention are also described. The methods include placing at least one nut plate of the invention at a location in a mold and molding or curing a substrate around the nut plate, such that the grooves of the anchor contain a portion of the cured or molded substrate.

Methods of attaching a first workpiece to a second workpiece are included. The methods encompass the steps of manufacturing a first workpiece with a nut plate by placing at least one nut plate of the invention at a location in a mold and molding or curing a substrate around the nut plate, such that the grooves of the anchor contain a portion of the cured or molded substrate, placing a threaded nut against the superior face of the base plate and retaining the nut in the cage area by engaging a retainer with the extensions, inserting a bolt that is attached to a second workpiece into the nut, and bolting the first workpiece to the second workpiece.

A nut plate-workpiece monolith that includes a workpiece portion having at least one substantially planar surface extending from which is a plurality of extensions for engaging a fastener, each of the extensions extending from the substantially planar surface in a direction substantially perpendicular to the planar surface, the extensions defining a cage region between the extensions, and the extensions being adapted to receive a retainer for retaining the fastener against the surface in the cage region and the cage region is in a fixed disposition relative to the surface of the substrate, wherein the extensions and the planar surface of the workpiece are co-mold such that they form a monolithic part is also contemplated with the scope of the invention.

Methods of manufacturing a workpiece with a nut plate comprising placing at least one nut plate at a location in a mold and molding or curing a substrate around the nut plate, such that the nut plate is adhered to the workpiece are included. In such method, the nut plate may be any known or developed in the art.

DETAILED DESCRIPTION OF THE INVENTION

The invention described herein includes rivetless nut plates, nut plate assemblies containing the rivetless nut plates, methods of manufacturing workpieces containing the rivetless nut plates (and/or assemblies), and/or methods of securing a first workpiece to a second workpiece using the nut plates of the invention. By "rivetless" it is meant that rivets are not required to secure the nut plate to substantially the requisite standard for the end use for which it is intended, for example, the standards set by the National Institute of Standards and Technology for connectors used in aerospace applications or those set by the National Aerospace Association of America, Inc. For example, the standard against which the nut plate and/or nut plate assemblies described herein may be evaluated include NASM 25027 (National Aerospace Standard, "Nut, Self-Locking 250° F., 450° F., and 800° F.", Approval Date September 1999).

The articles and methods of the invention differ from the prior art technology in a myriad of advantages; for example, the installation of the nut plate of the invention does not require: (1) breach of the structures of the workpiece as no worked holes are required, (2) use of cost-additive materials, such as rivets and/or adhesive, (3) additional time and/or skill to install (e.g., for working of holes and preparation of adhesive), yet, the technology meets the technical criteria applied for the nut plate in a given end application. The nut plate of the invention is further advantageous in that it is designed to include an anti-rotation feature and an anti "pull out" feature, as described in detail below.

The invention in some embodiments will be described with reference to the drawings herein. In the specification, words such as "inner" and "outer," "upper" and "lower," "superior" and "inferior," "distal" and "proximal", "inwardly" and "outwardly," and "upwardly" and "downwardly," and words of similar import are used for assisting in the understanding of the invention when referring to the drawings and absent a specific definition or meaning otherwise given by the specification for such terms should not be considered limited to the scope of the invention.

Contemplated within the scope of the invention are nut plates, nut plate-workpiece monoliths, related nut plate assemblies and methods of using and manufacturing the same. In an embodiment, the invention includes a nut plate that that includes three portions.

Referencing the FIGS., the three general portions of the nut plate 100 are: a base plate 102 interposed between one or more extensions or a plurality of extensions (108a, 108b) and an anchor 112. When located in a workpiece, the anchor 112 of the nut plate is disposed substantially within the substrate of the workpiece such that the bottom or inferior face 104 of the base plate is substantially flush to the outermost surface of the work piece (not shown).

The base plate 102 may be any format when viewed in plan view, such as, example, a non-uniform polygon, a square, an oval, a rectangle. It may be preferred that the format is substantially circular when viewed in plan view, as is shown in the FIGS. included herein. The base plate includes an outermost edge 101, which may be a flat edge or may bear one or more bevels or chamfers 103.

In an embodiment, the base plate may include a base plate bore 105. If present, the base plate bore 105 may be coaxial with a bore 126 that is present in the anchor. The diameter of the base plate bore 105 may be substantially the same as the diameter of the anchor bore 126, or it may be larger or smaller. The base plate includes an inferior face 104 and a superior face 106. Each of these faces may be independently substantially planar. In situ in the workpiece, the inferior face is 104 substantially flush with a surface of the workpiece, and the superior face 106 is outwardly oriented to accept a fastener or nut.

The base plate 102 may contain a bore 105 that is in communication with the cage region 110. In some embodiments the bore 105 may be in communication with a bore 126 present in the anchor body. Extending outwardly from the superior face 106 of the base plate 102 are a plurality of extensions 108a, 108b.

In an embodiment that may be preferred, the extensions 108a, 108b extend from the superior face 106 of the base plate 102 at a substantially 90° angle (i.e., extend perpendicularly), although any angle may be used if desired. The extensions define a cage region 110 between or among themselves into which a fastener 125 may be received and retained, optionally by a retainer 124, against the superior face of the base plate.

The extensions 108a, 108b are adapted to receive a retainer, that is, the extensions are structural configured to receive and/or secure a retainer. The precise structure of the extension will therefore necessarily vary depending on the structure of the retainer one intends to use.

For example, referencing the FIGS., in an embodiment, one or both of the inner surface 140a, 140b or of the outer surface 142a, 142b of the extensions 108a, 108b may contain an indentation 130 suitably adapted to engage a retainer. In an embodiment, the retainer may be a retainer clip 135, and the outer surface 142a,142b of the extensions 108a, 108b contains indentations in the form of substantially horizontal channels 130 into which portions of the retainer clip sit. The retainer and extensions serve to securely hold the fastener in a substantially vertical direction, but may be configured to permit controlled lateral movement ("float") of the fastener relative to the superior face of the fixed base plate.

The nut plate 100 further includes an anchor 112. The anchor 112 includes a body 114 that extends from the inferior face 104 of the base plate 102, to a distal end of anchor 116. The anchor body may have any geometric format desired, for example when viewed in cross section, the anchor body may have the shape of a polygon, a square, a rectangle, an oval or a circle. In some embodiments, it may be preferred that the body 114 has a conformation that is not rotationally symmetrical about an axis perpendicular to the inferior face of the base plate, to lessen or avoid undesirable rotation in situ.

In an embodiment, the anchor body 114 is an axially flattened cylinder. By "axially flattened cylinder," it is meant a cylinder that, when viewed in cross section, is flattened along at least one portion of the circumference of the cross section. In an embodiment, a hypothetical plane passed through the flattened portion may be generally parallel to the axis of rotation of the cylinder. In an embodiment, the cylinder is flattened in at least 2 portions, such that it bears at least one pair of flattened faces 128a, 128b on opposite sides of the anchor body 104. The pair of flattened faces 128a and 128b may be substantially parallel to one another.

In another embodiment, the anchor body 114 is an axially flattened cylinder that has one or more grooves 118 that are disposed on a surface of the anchor body 114 between the inferior face 104 of the base plate 102 and the distal end 116 of the anchor body 114. The groove(s) 118 may be on an outer surface 122 of the anchor body 114, and/or, in an embodiment that includes an anchor body 114 with a bore 126, the groove(s) 118 may be in an inner surface (not shown) of the anchor body 114. In some embodiments, it may be desirable that the groove 118 has an orientation that is not parallel to an axis of symmetry of the anchor 112.

In an embodiment where the anchor body 114 is an axially flattened cylinder, it may be desirable that the anchor has a pair of grooves 118 disposed on opposite sides of the cylinder and each of indentations are substantially parallel to one another. In some embodiments, the groove 118 may extend into at least a portion of the flattened face 128.

When the anchor 112 of the nut plate 100 is embedded in a substrate, the inferior face 104 of the base plate 102 is flush against the surface of the substrate; the nut plate cannot be withdrawn from the substrate without breaking or deforming the portion of the substrate accommodated within the groove 118, the nut plate 100 cannot be rotated about the anchor 112, and the nut plate 100 presents the cage region 110 in a fixed disposition relative to the surface of the substrate.

In an embodiment of the invention, the nut plate may be formed as one piece, that is, the anchor, base plate and extensions being monolithic. Alternatively, the anchor, base plate, and extensions are unitary. For example, each of the anchor, base plate, and extensions may be formed separately, from different materials if desired, and affixed together, by, for example and without limitation, an adhesive, welding, brazing, or a mechanical fastener, such as a staple, pin or screw. In an additional alternative embodiment, at least two of the anchor, the base plate and the extensions are monolithic and the remaining component is manufactured separately (out of a different material if desired) and affixed to the monolithic piece as described above.

The nut plate (or independently, any of its component parts, if not monolithic) may be formed from any material known or to be developed. As one of skill in the art will recognize, the selected material(s) will necessarily differ depending on the desired end use envisioned for the nut plate. Such materials may include, without limitation, carbon steel, alloy steels, stainless steels, 17-4PH stainless, 17-7PH stainless, 300 series stainless, 400 series stainless; Inconel, Waspalloy stainless, high performance polymers or polymer composites, and titanium. Non-limiting examples of suitable polymers or polymer composites include those listed below as potential materials for the workpiece.

In some embodiments, the nut plate (or independently any of its component parts, if not monolithic) may be formed of a first material (as described above) and coated or provided with one or more coatings or layers of an alternative materials. Coating material(s) may include, without limitation, a polymer, zinc, cadmium, aluminum, nickel, and/or chromium. Non-limiting examples of suitable polymers include, for example, those listed below as potential materials for the workpiece.

The invention also includes a workpiece that itself includes a surface or substrate to which the nut plate of the invention is fixed. The substrate may be integral with the work piece or it may be affixed to the workpiece subsequently. The workpiece may be any article or component to which one wishes to affix a nut plate, such as, for example, aerospace component parts, automotive component part, medical component parts, and/or structural component parts. By "structural component part," it is meant materials used in the construction of temporary or permanent architectural structures, such as shelters, hangars, storage sheds, etc.

The workpiece may be formed of any material desired. The substrate on the workpiece into which the nut plate in affixed may be formed of any material, so long as such material is moldable (that is, it can exist as a flowable and/or formable material that can be cured, dried or hardened into a substantially non-flowable or fixed material). Suitable materials include without limitation, metals, natural and synthetic clays, proteinaceous matrix materials, thermoplastic and/or thermoset polymers and polymer composites. If the material selected is a polymer or polymer composite, the material may include one or more polymer or copolymer(s) and/or a property-enhancing additive.

Suitable polymers may include the following exemplary materials: polyolefins (such as polyethylene, polybutylene, polypropylene), poly(acrylonitrile-butadiene-styrene) (ABS), polystyrenes, polybutadiene, polyacrylonitrile (PAN), poly(butadiene-styrene) (PBS), poly(styrene-acrylonitrile) (SAN), polybutylenes, cellulosic resins (such as ethylcellulose, cellulose acetate, cellulose acetate butyrate, cellulose acetate propionate, and cellulose nitrate), polyethylene vinyl alcohols (EVA), polyethylene vinyl acetates, fluoropolymers (such as melt-processible fluoroplastics (such as copolymers of tetrafluoroethylene (TFE) and at least one perfluoroalkylvinyl ether (PAVE) (PFA), copolymers of TFE and at least one other perfluorinated alkylene (such as hexafluoropropylene) (FEP)), poly(chlorotrifluoroethylene), polyethyl chlorotrifluoroethylene (ECTFE), polyethyltrifluoroethylene (ETFE), polyvinyl fluoride (PVF) and polyvinylidene fluoride (PVDF)), ionomers, liquid crystalline polymer (LCP), polyacetals, polyacrylates, polyamides (such as NYLON 12, NYLON 6), polyphthalimides, polyimides, polyetheramides, polyamideimides, polyphenols, polycarbonates, polyesters, polyurethanes, polyvinylchlorides (PVC), polyvinylidene chlorides, polyvinyls, polyphenylene oxides (PPO), polyphenylene ethers, polyphenylene esters, polyphenylene ether esters, polyphenylene sulfides, polysulfones, polymethylpentenes, polyketones, polyarylene (PAE and PAEK) polymers (such as polyether ether ketone (PEEK), polyether ketone (PEK), polyether ketone (PEKK), polyether ether ketone ketone (PEEKK), and polyether ketone ether ketone ketone (PEKEKK)), thermoplastic elastomers (such as ethylene propylene diene monomers (EPDM), ethylenepropylene rubber (EPR) and polyurethane elastomers), polyethylene chlorinates, biscitraconicimides (BCI), bismaleimides (BMI), bismaleimide/triazine/epoxy resins, cyanate esters, cyanate resins, furanic resins, phenolic resins, urea-formaldehyde resins, melamine-formaldehyde resins, phthalocyanine resins, polybenzoxazole resins, acetylene-terminated polyimide resins, silicones, polytriazines, polyalkyds, and xylene resins.

Also included may be co-polymers (polymers formed of two or more monomeric species in random or block form, or graft copolymers, any of which may have multiple monomeric components or reactants) of each or any of these materials either with each other or with other polymeric, monomeric or oligomeric species may also be used, whether known or to be developed. In addition, such materials, provided they are still useful for forming, may be derivatized and/or include functional groups (whether terminal and/or on the chain), branched and/or straight chain backbone structures, additional locations of unsaturation along the chain or side groups, and the like. Functional groups which may be provided include aryls, ketones, acetylenes, acid groups, hydroxyl, sulfur-containing groups, sulfates, sulfites, mercapto, phosphato, carboxyl, cyano, phosphite, oxygen/ether or esters (also can be incorporated within the chains or side chains), carboxylic acid, nitric, ammonium, amide, amidine, benzamidine, imidizole, and the like.

The selected polymer(s) for the substrates may also be used in mixtures, blends, alloys or copolymerized with each other or other monomers to form new random, block or graft copolymers. It is also possible for use within the invention to employ materials such as certain high-temperature crosslinkable polyimides and polysulfones and thermosetting materials having similar properties to those of thermoplastics.

Polymer composites may include any polymer or copolymer (including those listed above) and one or more properties-enhancing additive. Exemplary additive include, for example, silicon dioxide, silica, alumina, talc, chopped or short fibers (glass, PTFE, TFE copolymers, carbon, graphite, etc.), barium sulfate, glass spheres, ribbons or platelets, wollastonite, titanate whiskers, compatibilizers, rheological or thixotropic agents, antistatic agents (which may also be incorporated through use of functional groups and/or graft copolymers provided to the thermoplastic matrix), and other similar fillers, tribological additives and other reinforcing agents. It is preferred that such additives be present in an amount no greater than about 25%, and preferably no greater than about 10% of the composite by weight based on the total weight of the composite; however, more or less materials may be used depending on desired properties and end uses.

If a reinforcing fiber(s) is included, it may be a single type of fiber or a combination or blended material, i.e., more than one fiber type may be used within the polymeric matrix material, including for example, without limitation, glass, carbon, graphite, aramid, ceramic, PTFE (available commercially as Teflon®), basalt, quartz, boron, hemp, polybutylene oxide (PBO), alumina, TFE copolymer, glass/carbon, glass/graphite/carbon, graphite/carbon, aramid/glass, ceramic/glass and PTFE or TFE copolymer fiber/carbon blends. Such fibers may be organic or inorganic, including various materials such as noted above and preferably ceramic, glass, graphite, carbon, and/or plastic (thermoplastic and thermoset) fibers (such as aramid fiber, available commercially as Kevlar®). The continuous fibers may be unidirectional or bi-directional continuous fibers, although unidirectional fibers are preferred (if bidirectional, it is preferred that no more than about 50% of the fibers are present in the transversely extending direction), stretch-broken, braided fibers and woven continuous fibers. Additionally, the fibers may be braided or commingled fibers.

All of the above materials may include various other fillers known or to be developed in the art. Various fillers may be used including pigments, dyes, glass, ceramic, mesh, mica, clay, organic colorants, plasticizers, thixotropic agents, flame retardants, UV absorbers, extenders, and stabilizers.

While the above-articulated materials may be preferred, the list should not be considered to be exhaustive, and one skilled in the art would understand based on this disclosure that other materials may be used in the invention without departing from the scope thereof.

Figure 7:
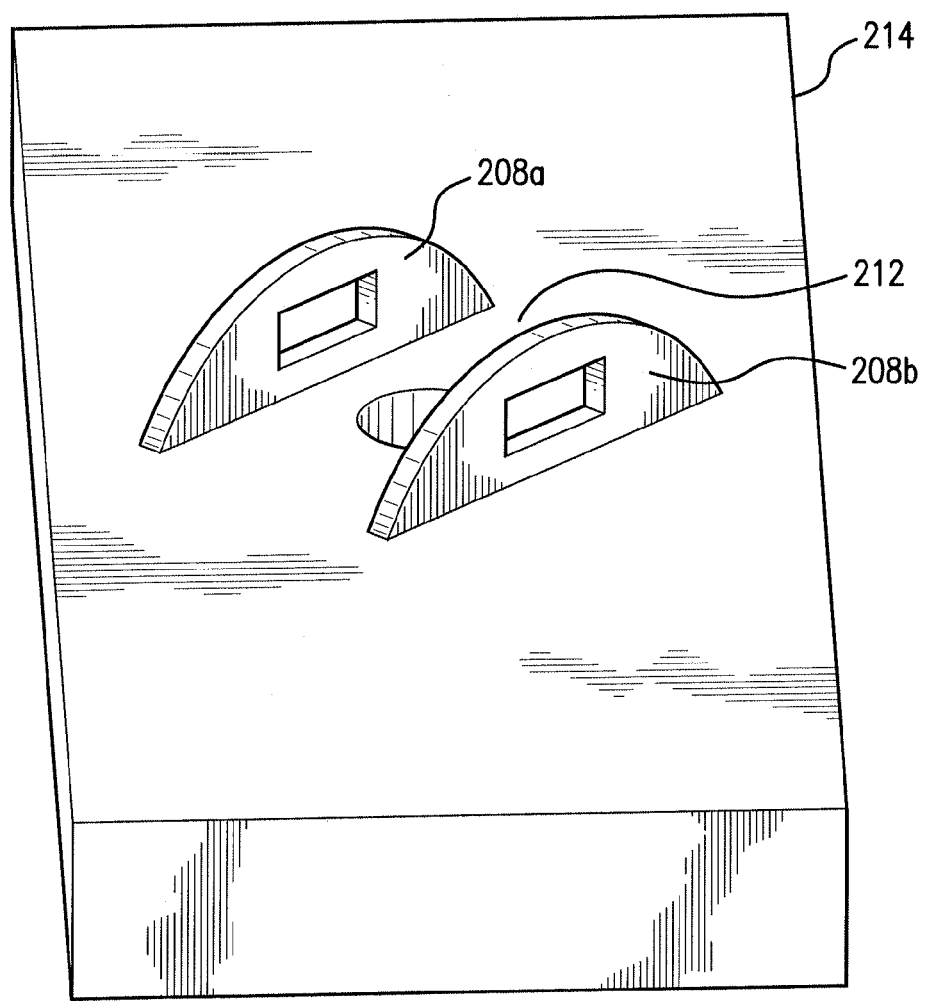
FIG. 7 is a perspective view of an additional embodiment of the invention where the nut plate and the workpiece are molded as a monolithic part.
Figure 8:
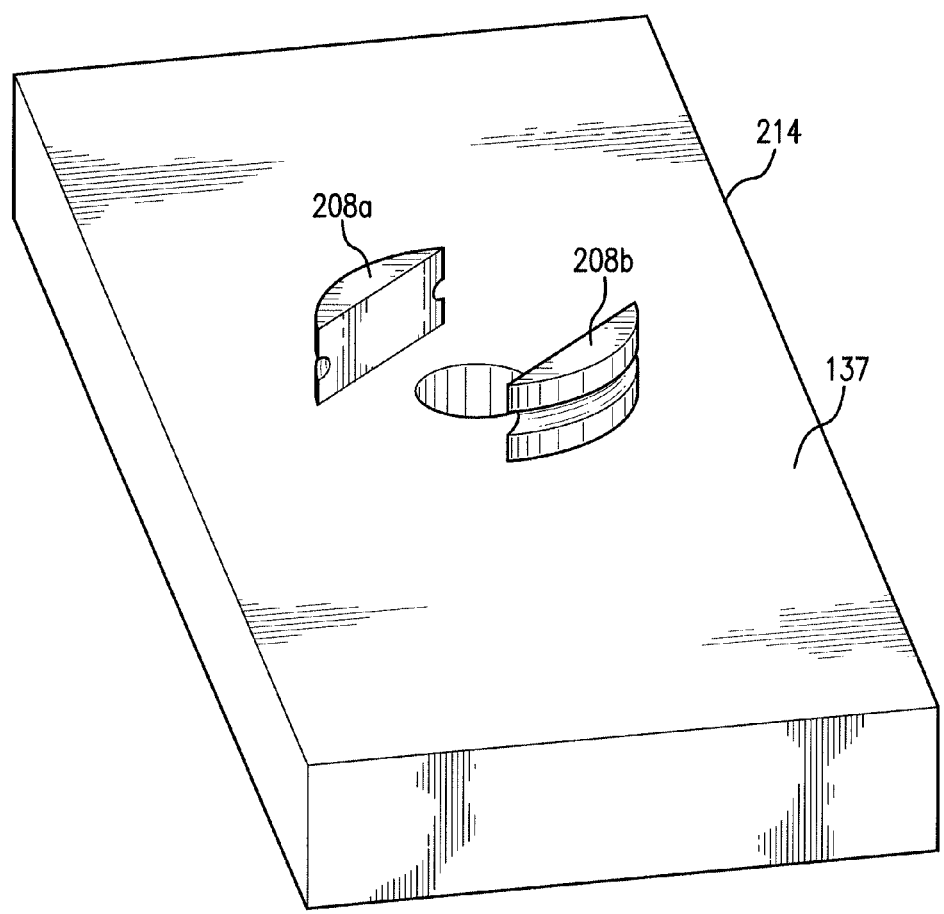
FIG. 8 is a perspective view of a nut plate assembly including the nut plate/workpiece monolith of FIG. 7.

As an additional embodiment, the invention includes a workpiece-nut plate monolith ("monolith"), wherein the monolith is molded such that the workpiece bears extensions. Referencing FIGS. 7 and 8, a workpiece 214 having a substantially planar surface 212, from which a plurality of extensions 208a, 208b extend. Each of the extensions extends from the substantially planar surface in a direction substantially perpendicular to the planar surface 212. The extensions 208a and 208b define a cage region 210 and are adapted to receive a retainer for retaining the fastener against the surface in the cage region. In an embodiment, the cage region 210 is in a fixed disposition relative to the planar surface 212 of the substrate, wherein the extensions and the planar surface of the workpiece are co-mold such that they form a monolithic part. The molding process may be any used or known in the art, including the methods described herein.

In some embodiments, the monolith or nut plate described herein may have one extension.

Figure 6:
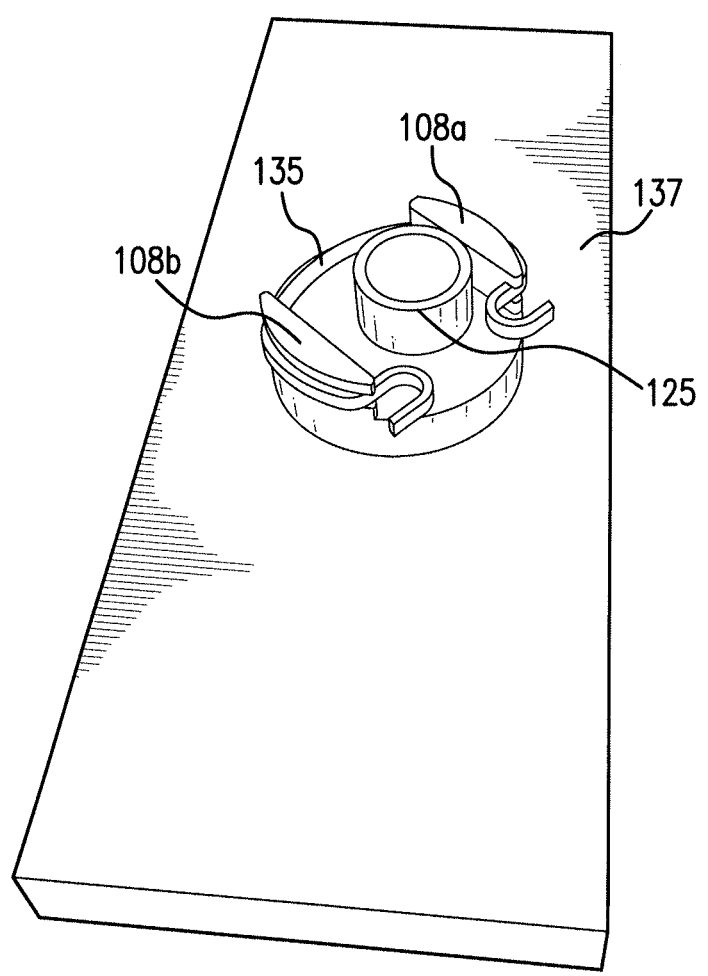
FIG. 6 is a view of an embodiment of the nut plate assembly of the invention as installed in a workpiece.
Figure 9:
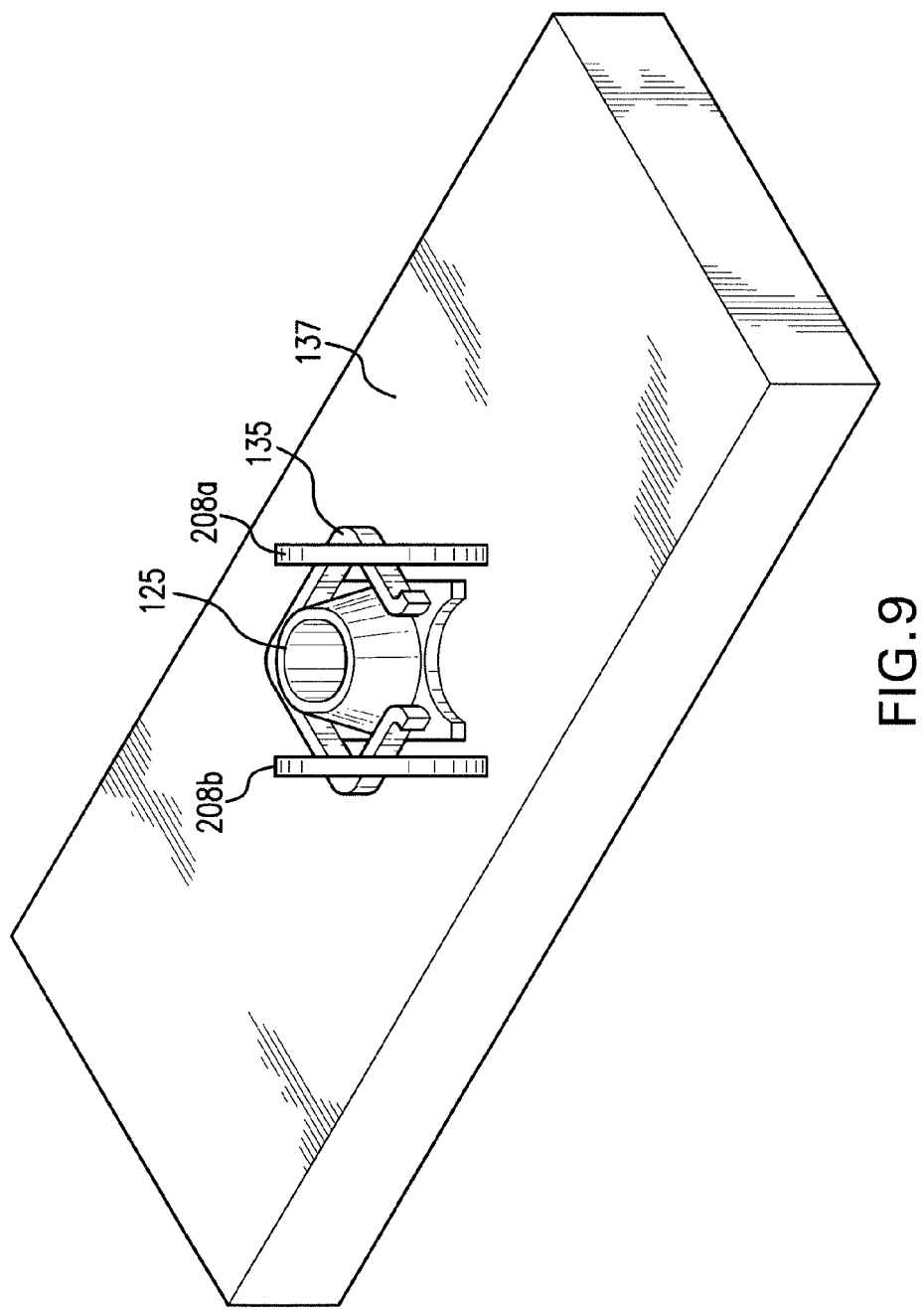
FIG. 9 is a perspective view of an second additional embodiment of the invention where the nut plate and the workpiece are molded as a monolithic part.
Figure 10:
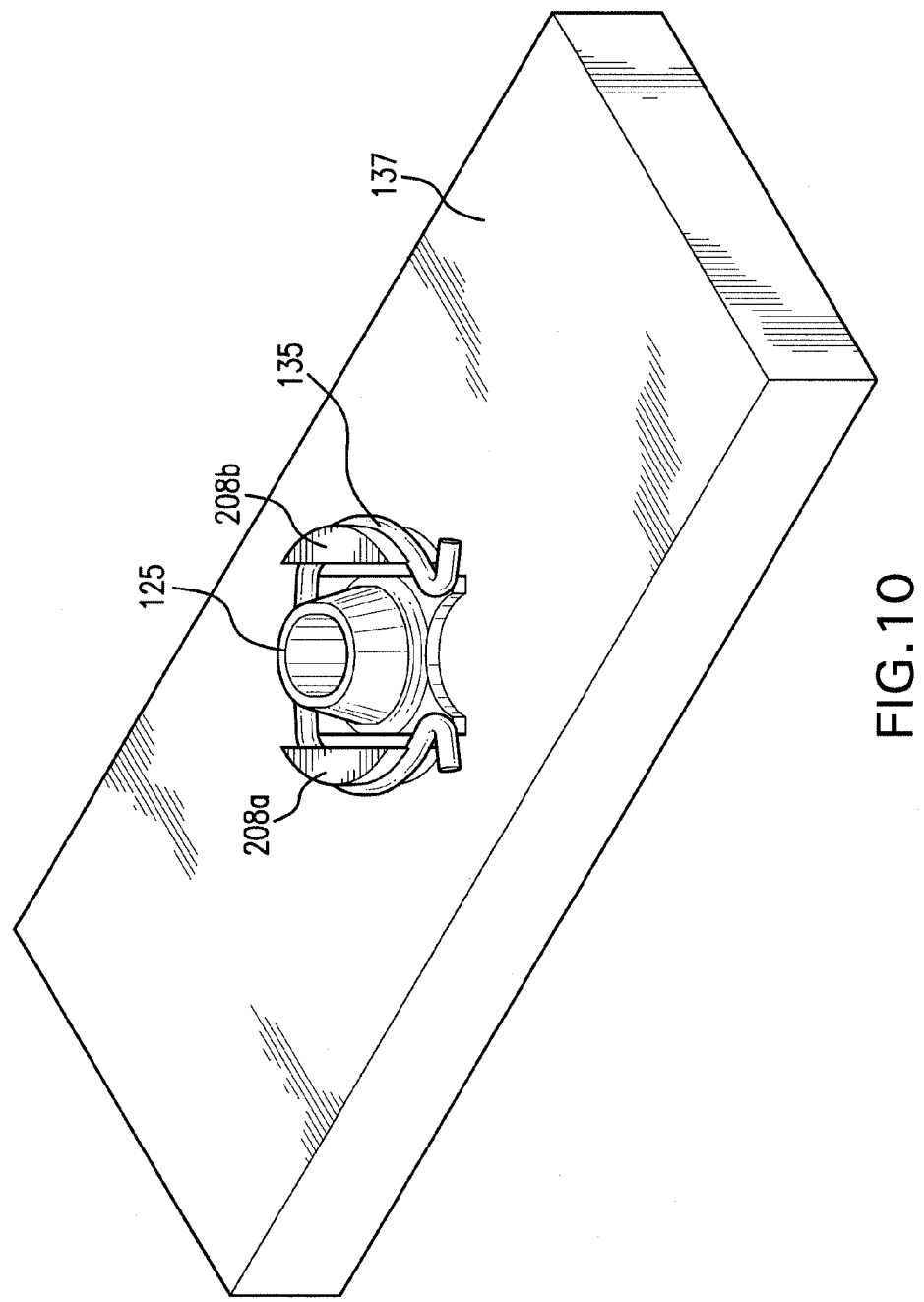
FIG. 10 is a perspective view of a nut plate assembly including the nut plate/workpiece monolith of FIG. 10.

Further contemplated within the scope of the invention are nut plate assemblies that include the nut plate of the invention and additional components, such as a fastener, and a retainer for securing the fastener within the nut plate, as described above. The fastener may be, for example, a threaded nut, and the retainer may be a clip, for example a D-shaped clip, a twist wire, or other retainer. FIG. 6 illustrates the nut plate assembly of the invention, where the nut plate is in situ in a workpiece 137, and the fastener 125 (a nut) and the retaining clip 135 are in place on the assembly. FIGS. 9 and 10 illustrate a nut pate assembly using the monolith embodiment of the invention, where a fastener and a retaining clip are in place on the assembly.

The nut plate is secured in the component part by molding the workpiece substrate (or a substrate included in, or subsequently added to, the workpiece) around the anchor of the nut plate. Any molding process can be used; the process parameters will vary depend on the material that is selected for molding. In general, the process will involve dissembling the nut plate assembly, placing the nut plate into the mold tool, closing the mold, delivering the material to be molded into the mold, processing the mold under selected parameters (temperature, pressure, dwell time, etc.) and removal and cleaning of the part. If the nut plate as described herein is used, only the anchor portions is molded into the workpiece such that after molding, the inferior face of the base plate of the nut plate is substantially flush against the surface of the workpiece substrate.

Figure 11:
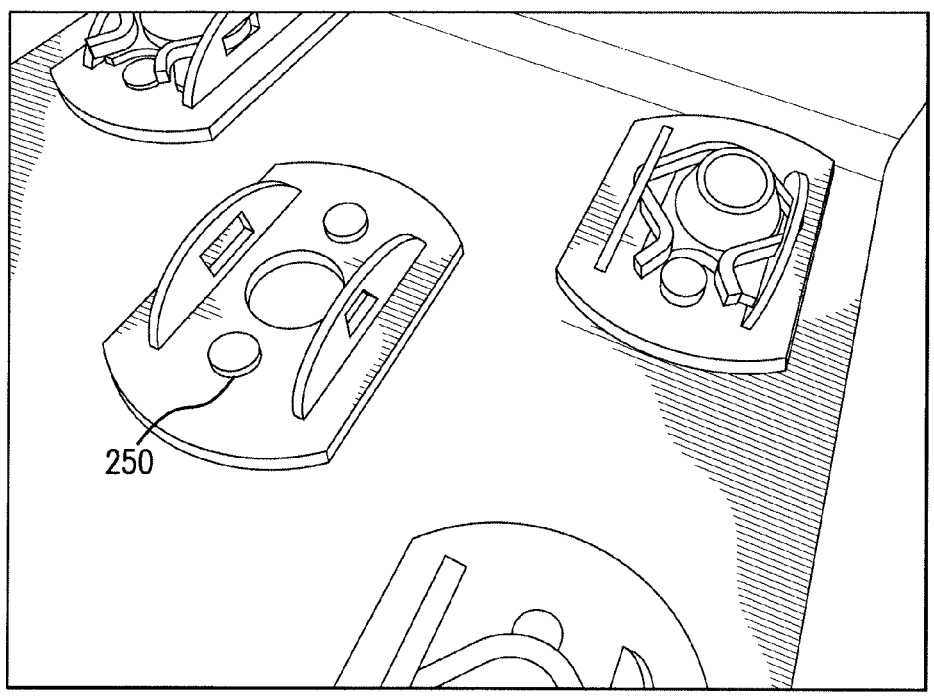
FIGS. 11, 12 and 13 show prior art nut plates (and nut plate assemblies) attached to a composite workpiece using the method of the invention.
Figure 12:
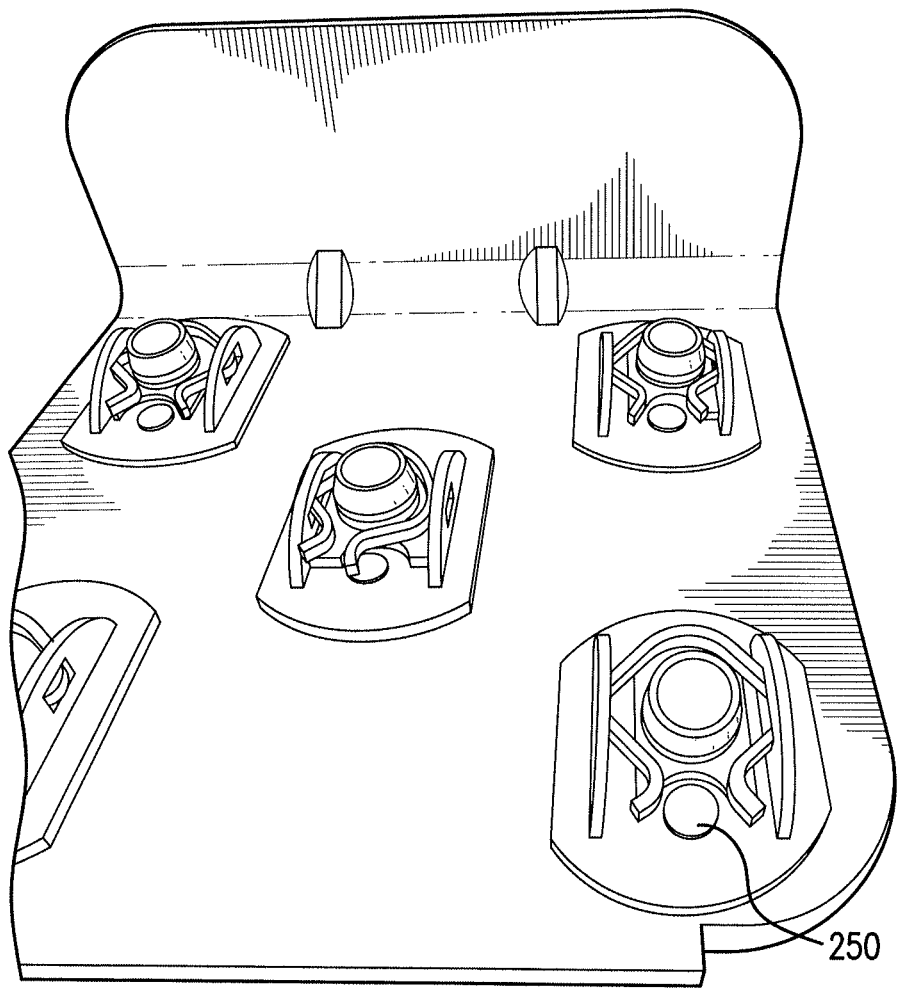
Figure 13:
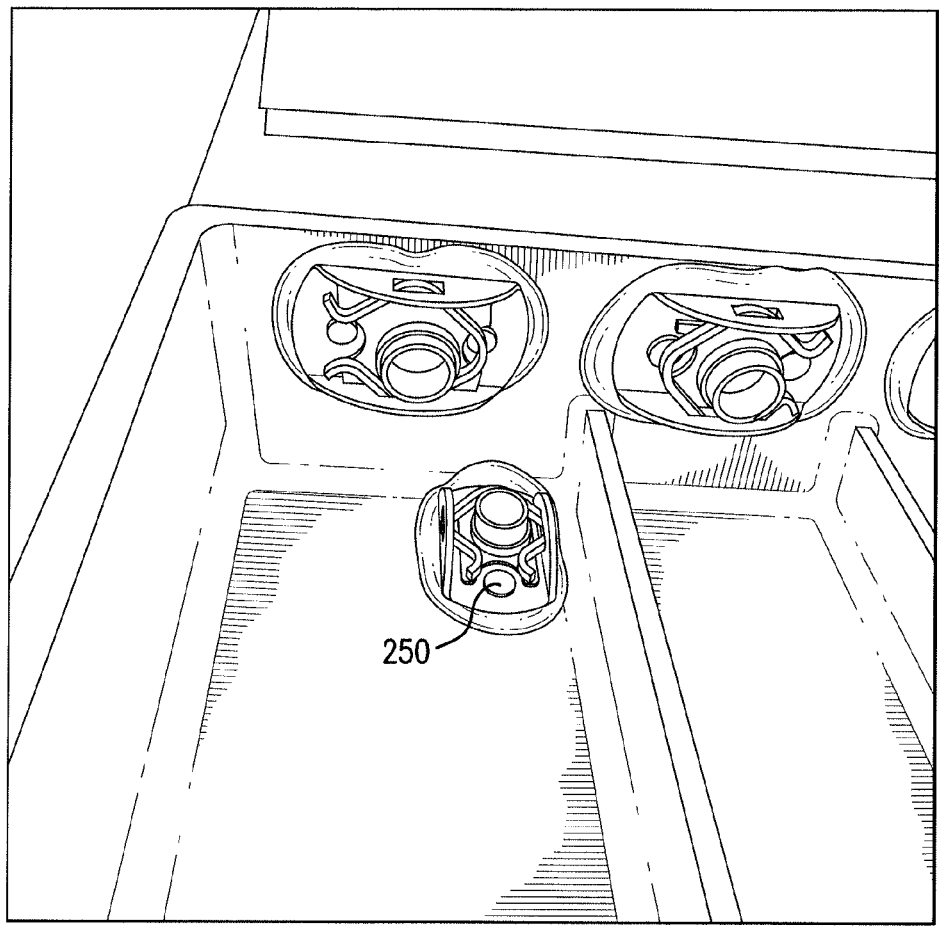

In some embodiments, the molding process described above is used to mold a conventional, prior art plate into a workpiece. FIGS. 11, 12 and 13, show conventional prior art nut plates molded into a work piece.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A rivetless nut plate comprising:
a base plate having a substantially planar inferior face and a substantially planar superior face,
a plurality of extensions for engaging a fastener, each of the extensions extending from the superior face in a direction substantially perpendicular to the superior face, the extensions defining a cage region between the extensions, and the extensions being adapted to receive a retainer for retaining the fastener against the superior face in the cage region, and an anchor comprising a body that is an axially flattened cylinder and which extends from the inferior face to a distal end, the body having a groove to contain a portion of a substrate that is formed about the anchor, the groove being disposed between the inferior face and the distal end and having an orientation that is not parallel to an axis of symmetry of the anchor and the body having a conformation that is not rotationally symmetrical about an axis perpendicular to the inferior face of the base plate, whereby when the anchor of the nut plate is embedded in a substrate, the inferior face of the base plate is flush against the surface of the substrate, the nut plate cannot be withdrawn from the substrate without breaking or deforming the portion of the substrate accommodated within the groove, the nut plate cannot be rotated about the anchor, and the nut plate presents the cage region in a fixed disposition relative to the surface of the substrate.

2. The nut plate of claim 1, wherein the groove is disposed on an outer face of the cylinder in a plane substantially perpendicular to the axis of the cylinder.

3. The nut plate of claim 1, having a first bore extending through the anchor and a second bore extending through the base plate, the base plate being rotationally symmetrical about the axis of the bore.

4. The nut plate of claim 3, wherein the first bore communicates with the cage region.

5. The nut plate of claim 3, wherein the anchor body is an axially flattened cylinder and the cylinder is coaxial with the first bore and the second bore.

6. The nut plate of claim 5, wherein the anchor has a pair of flattened faces disposed on opposite sides of the cylinder and each of the flattened faces are substantially parallel to one another.

7. The nut plate of claim 1, wherein the extensions have an indentation extending about the extensions for engaging a retainer therein.

8. The nut plate of claim 7, wherein each of the extensions has an outer periphery and the indentation extends substantially about the entire outer periphery of the extension.

9. The nut plate of claim 8, wherein the indentation extends substantially about at least 50% of the out periphery of the extension.

10. The nut plate of claim 1, wherein the anchor, base plate and extensions are monolithic.

11. The nut plate of claim 1, wherein the anchor, base plate, and extensions are unitary.

12. The nut plate of claim 1, wherein at least two of the anchor, the base plate and the extensions are monolithic.

13. The nut plate of claim 1 wherein one or more of the anchor, the base plate and the extension(s) are made of a material selected from the group consisting of carbon steel, alloy steels, stainless steels, 17-4PH stainless, 17-7PH stainless, 300 series stainless, 400 series stainless; Inconel, Waspalloy stainless, high performance polymer, or polymer composites, and titanium.

14. The nut plate of claim 1 wherein one or more of the anchor, the base plate and the extension(s) bears a coating comprising a material selected from the group consisting of a polymer, zinc, cadmium, aluminum, nickel, and/or chromium.

15. A workpiece comprising a substrate and the nut plate of claim 1.

16. The workpiece of claim 15 wherein the workpiece is an aerospace component part.

17. The workpiece of claim 15 wherein the workpiece is an automotive component part.

18. The workpiece of claim 15 wherein the workpiece is a medical component part.

19. The workpiece of claim 15 wherein the workpiece is a structural component patio.

20. A nut plate assembly comprising:
a nut plate of claim 1;
a retainer, and
a fastener,
wherein the retainer engages the extensions and retains the fastener within the cage region and against the superior face of the base plate.

21. The assembly of claim 20, wherein the extensions have an indentation extending about the extensions for engaging a retainer therein and the retainer is a retaining clip that engages at least one indentation.

22. The assembly of claim 20, wherein the fastener is a threaded nut.

23. A method of manufacturing a workpiece with a nut plate comprising placing at least one nut plate of claim 1 at a location in a mold and molding or curing a substrate around the nut plate, such that the grooves of the anchor contain a portion of the cured or molded substrate.

24. A method for attaching a first workpiece to a second workpiece comprising manufacturing a first workpiece with a nut plate by placing at least one nut plate of claim 1 at a location in a mold and molding or curing a substrate around the nut plate, such that the grooves of the anchor contain a portion of the cured or molded substrate, placing a threaded nut against the superior face of the base plate and retaining the nut in the cage area by engaging a retainer with the extensions, inserting a bolt that is attached to a second workpiece into the nut, and bolting the first workpiece to the second workpiece.

25. The method of claim 24 wherein the substrate is attached to a workpiece after the nut plate has been affixed to the substrate.

26. A nut plate-workpiece monolith comprising a workpiece portion having at least one substantially planar surface extending from which is a plurality of extensions for engaging a fastener, each of the extensions extending from the substantially planar surface in a direction substantially perpendicular to the planar surface, the extensions defining a cage region between the extensions, and the extensions being adapted to receive a retainer for retaining the fastener against the surface in the cage region and the cage region is in a fixed disposition relative to the surface of the substrate, wherein the extensions and the planar surface of the workpiece are comolded such that they form a monolithic part.

27. The monolith of claim 26, wherein the extensions have an indentation extending about the extensions for engaging a retainer therein.

28. The monolith of claim 27, wherein each of the extensions has an outer periphery and the indentation extends substantially about the entire outer periphery of the extension.

29. The monolith of claim 28, wherein the indentation extends substantially about at least 50% of the out periphery of the extension.

30. A method of manufacturing a workpiece with a nut plate comprising placing at least one nut plate at a location in a mold and molding or curing a substrate around the nut plate, such that the nut plate is adhered to the workpiece.

31. A method for attaching a first workpiece to a second workpiece comprising manufacturing a first workpiece with a nut plate by placing at least one nut plate at a location in a mold and molding or curing a substrate around the nut plate, such that the nut plate is affixed to the workpiece.

\* \* \* \* \*